(12) United States Patent
Liu et al.

(10) Patent No.: US 12,508,174 B2
(45) Date of Patent: Dec. 30, 2025

(54) NONWOVEN AND ABSORBENT ARTICLES HAVING THE SAME

(71) Applicant: The Procter & Gamble Company, Cincinnati, OH (US)

(72) Inventors: Xiaoxin Liu, Beijing (CN); Sijia Wang, Beijing (CN); Fancheng Wang, Beijing (CN); Tong Tong, Beijing (CN); Kun Sun, Beijing (CN); Xiaohui Dong, Beijing (CN)

(73) Assignee: The Procter & Gamble Company, Cincinnati, OH (US)

( * ) Notice: Subject to any disclaimer, the term of this patent is extended or adjusted under 35 U.S.C. 154(b) by 284 days.

(21) Appl. No.: 17/510,660

(22) Filed: Oct. 26, 2021

(65) Prior Publication Data
US 2022/0133552 A1    May 5, 2022

(30) Foreign Application Priority Data

Oct. 30, 2020   (WO) ................ PCT/CN2020/125264
Sep. 6, 2021    (WO) ................ PCT/CN2021/116697

(51) Int. Cl.
*A61F 13/511* (2006.01)
*A61F 13/512* (2006.01)

(52) U.S. Cl.
CPC .... *A61F 13/51104* (2013.01); *A61F 13/5121* (2013.01); *A61F 2013/51178* (2013.01)

(58) Field of Classification Search
CPC ............ A61F 13/51104; A61F 13/5121; A61F 2013/51178; A61F 2013/5149; A61F 13/15731
See application file for complete search history.

(56) References Cited

U.S. PATENT DOCUMENTS

| | | | |
|---|---|---|---|
| 6,673,418 | B1 | 1/2004 | Deolivera |
| 7,553,532 | B2 | 6/2009 | Turner et al. |
| 8,021,591 | B2 | 9/2011 | Curro |
| 10,045,888 | B2 | 8/2018 | Strube et al. |
| 2008/0108962 | A1 | 5/2008 | Furuta et al. |

(Continued)

FOREIGN PATENT DOCUMENTS

| | | |
|---|---|---|
| CN | 206324925 U | 7/2017 |
| CZ | 2020105 A3 * | 9/2021 |

(Continued)

OTHER PUBLICATIONS

PCT Search Report and Written Opinion for PCT//CN2020/125264 dated Oct. 30, 2020, 9 pages.

(Continued)

*Primary Examiner* — Susan S Su
*Assistant Examiner* — Erin A Kim
(74) *Attorney, Agent, or Firm* — Sarah M. DeCristofaro

(57) ABSTRACT

The present invention relates to a three-dimensional nonwoven comprising a first side, a second side, a protruded first area comprising an upper portion formed in the first side and a lower portion formed in the second side, and a second area comprising a plurality of deformations, wherein the upper portion has a shape memory index higher than a shape memory index of the lower portion, an absorbent article comprising the three-dimensional nonwoven, and a process for producing the three-dimensional nonwoven.

21 Claims, 7 Drawing Sheets

(56) References Cited

U.S. PATENT DOCUMENTS

| | | | |
|---|---|---|---|
| 2012/0276238 A1 | 11/2012 | Strube | |
| 2016/0067118 A1* | 3/2016 | Hammons | B32B 3/30 428/137 |
| 2016/0278986 A1* | 9/2016 | Gross | A61F 13/513 |
| 2018/0221220 A1* | 8/2018 | Kuramochi | A61F 13/15203 |
| 2019/0053958 A1* | 2/2019 | Kurihara | A61F 13/53 |
| 2019/0060140 A1 | 2/2019 | Oshima et al. | |
| 2020/0375820 A1* | 12/2020 | Tagomori | A61F 13/534 |

FOREIGN PATENT DOCUMENTS

| | | | | |
|---|---|---|---|---|
| JP | S4932887 | A | 3/1974 | |
| JP | 2004194815 | A | 7/2004 | |
| JP | 2007175093 | A | 7/2007 | |
| JP | 2011137246 | A | 7/2011 | |
| JP | 2012090689 | A | 5/2012 | |
| WO | 2004080341 | A2 | 9/2004 | |
| WO | 2007144469 | A1 | 12/2007 | |
| WO | 2009105000 | A1 | 8/2009 | |
| WO | 2012148935 | A1 | 11/2012 | |
| WO | WO-2013005782 | A1 * | 1/2013 | ........ A61F 13/51104 |
| WO | 2016040120 | A1 | 3/2016 | |
| WO | 2017149792 | A1 | 9/2017 | |
| WO | 2017156162 | A1 | 9/2017 | |
| WO | 2017209009 | A1 | 12/2017 | |
| WO | 2018004478 | A1 | 1/2018 | |

OTHER PUBLICATIONS

PCT Search Report and Written Opinion for PCT/CN2021/116697 dated Dec. 20, 2021, 17 pages.

* cited by examiner ptibed in the first side and a lower portion formed the
NONWOVEN AND ABSORBENT ARTICLES HAVING THE SAME

CROSS REFERENCE TO RELATED APPLICATIONS

This application claims the benefit, under 35 USC 119(e), to PCT Application No. CN2020/125264 filed on Oct. 30, 2020 and PCT Application No. CN2021/116697 filed on Sep. 6, 2021, which are herein incorporated by reference in their entirety.

FIELD OF THE INVENTION

The present invention relates to nonwoven, a method for manufacturing the same, and also an absorbent article comprising the nonwoven.

BACKGROUND OF THE INVENTION

Nonwovens including synthetic fibers formed from thermoplastic resin are widely used as sheets constituting absorbent articles such as sanitary napkins, infant disposable diapers, personal care disposable diapers, and the like.

These absorbent articles comprise several layers providing different functions. A liquid permeable topsheet is disposed closest to the wearer's skin and should be capable of quickly absorbing the excreted fluid. A backsheet is disposed on the opposed, garment-facing side of the article. Some absorbent articles in the market further comprises a nonwoven outermost layer forming at least part of a garment-facing surface of an absorbent article. Other components of absorbent articles are well known, and include in particular an absorbent core disposed between the topsheet and the backsheet to absorb and retain the excreted fluids.

Three-dimensional nonwovens comprising three-dimensional elements can provide craftsmanship perception. Three-dimensional substrates may also provide improved fluid handling properties, and improved sensory feels such as skin softness, and cushion feel, etc.

In some configurations, nonwovens are supplied on rolls and moved to an absorbent article manufacturing location. During the absorbent article assembly process, nonwovens are unwound from the rolls and supplied to an assembly line that converts the nonwoven of material into absorbent articles. In some instances, nonwovens may be relatively tightly wound on the rolls, and as such, the associated high winding pressures may compress nonwoven webs, resulting in a reduced caliper. Such compressed nonwoven webs when incorporated into an absorbent article may have a thin appearance that conveys a message of reduced softness to a consumer and/or may be aesthetically unpleasing. They may also negatively affect various performances of the nonwoven webs. To mitigate the problems associated with nonwoven compression, some manufacturers may apply heat to the nonwoven once unwound from the rolls. In turn, the application of heat to some types of nonwoven may increase the caliper or volume of the web materials, referred to herein as "relofting".

JP5203349B discloses nonwoven fabric comprising thermally extensible fibers, multiple projected parts and recessed parts wherein the thermally extensible fibers constituting upper portions of the projected parts have a lower thermal elongation rate and are low-temperature thermally extensible raw material fibers to start thermal elongation at a relatively low temperature than the thermally extensible fibers constituting lower portions of the projected parts. The thermally extensible fibers rely on unique fiber properties gained by unique fiber production process which may limit the application in the industry because of process complexity and higher production cost.

Meanwhile, in absorbent articles having a nonwoven topsheet, a nonwoven with a capillary gradient has been desirable as it can provide better fluid drainage from the surface of the topsheet to an adjacent layer which can improve dryness and/or cleanness of an absorbent article.

There is a continuous need for a cost effective nonwoven which can create well perceivable three dimensional appearance, and for an absorbent article having such a nonwoven.

There is a continuous need for a cost effective nonwoven which can create well perceivable three dimensional appearance and provide improved fluid handling properties, and for an absorbent article having such a nonwoven.

There is a continuous need for a method to produce three-dimensional nonwoven in a cost effective way.

SUMMARY OF THE INVENTION

The present invention provides an absorbent article comprising a skin-facing surface, a garment-facing surface, a liquid permeable topsheet, a liquid impermeable backsheet, an absorbent structure disposed between the topsheet and the backsheet, and a three-dimensional nonwoven, wherein the three-dimensional nonwoven comprises a first side, a second side, a protruded first area comprising an upper portion formed in the first side and a lower portion formed the second side, and a second area comprising a plurality of deformations, and wherein a shape memory index of the upper portion is higher than a shape memory index of the lower portion.

The present invention also provides a three-dimensional nonwoven comprising a first side, a second side, a protruded first area comprising an upper portion formed in the first side and a lower portion formed in the second side, and a second area comprising a plurality of deformations, wherein the upper portion has a shape memory index higher than a shape memory index of the lower portion.

The present invention also provides a process for producing a three-dimensional nonwoven comprising the steps of: (a) forming a first fibrous web, and forming a second fibrous web; (b) forming a composite fibrous web by overlaying the first fibrous web on the second fibrous web wherein the first fibrous web forms a first side of the composite fibrous web and the second fibrous web forms a second side of the composite fibrous web; (c) subjecting the composite fibrous web to bonding treatment to bond at least part of fibers constituting the first fibrous web and the second fibrous web to obtain a precursor nonwoven; and (d) subjecting the precursor nonwoven to a deformation forming unit to form deformations in a predetermined area to obtain a deformed nonwoven, the deformed nonwoven comprising at least one protruded first area, and a second area comprising a plurality of deformations, wherein the protruded first area comprises an upper portion in the first side and a lower portion in a second side, and wherein a shape memory index of the upper portion is higher than a shape memory index of the lower portion.

These and other features, aspects, and advantages of the present invention will become.

DETAILED DESCRIPTION OF THE INVENTION

All ranges are inclusive and combinable. The number of significant digits conveys neither limitations on the indicated amounts nor on the accuracy of the measurements. All numerical amounts are understood to be modified by the word "about" unless otherwise specifically indicated.

The term "absorbent articles", as used herein, include disposable diapers, sanitary napkins, panty liners, incontinence pads, interlabial pads, breast-milk pads, sweat sheets, animal-use excreta handling articles, animal-use diapers, and the like.

The term "component" of an absorbent article, as used herein, refers to an individual constituent of an absorbent article, such as a topsheet, secondary layer, acquisition layer, liquid handling layer, absorbent core or layers of absorbent cores, and backsheets.

Three-Dimensional Nonwoven

As used herein, the term "nonwoven" or "nonwoven" refers to a web having a structure of individual fibers or threads which are interlaid, but not in a repeating pattern as in a woven or knitted fabric, which do not typically have randomly oriented fibers. Nonwoven or fabrics have been formed from many processes, such as, for example, meltblowing, spunbonding, hydroentangling, airlaid, wetlaid, through-air-dried paper making processes, and bonded carded web processes, including carded thermal bonding. The nonwoven can comprise unbonded fibers, entangled fibers, tow fibers, or the like. Fibers can be extensible and/or elastic, and may be pre-stretched for processing. Fibers can be continuous, such as those produced by spunbonded methods, or cut to length, such as those typically utilized in a carded process. Fibers can be bicomponent, multiconstituent, shaped, crimped, or in any other formulation or configuration known in the art for nonwoven and fibers. In general, the fibers can be bondable, either by chemical bond (e.g. by latex or adhesive bonding), pressure bonding, or thermal bonding. If thermal bonding techniques are used in the bonding process described below, a certain percentage of thermoplastic material, such as thermoplastic powder or fibers can be used.

Figure 1:
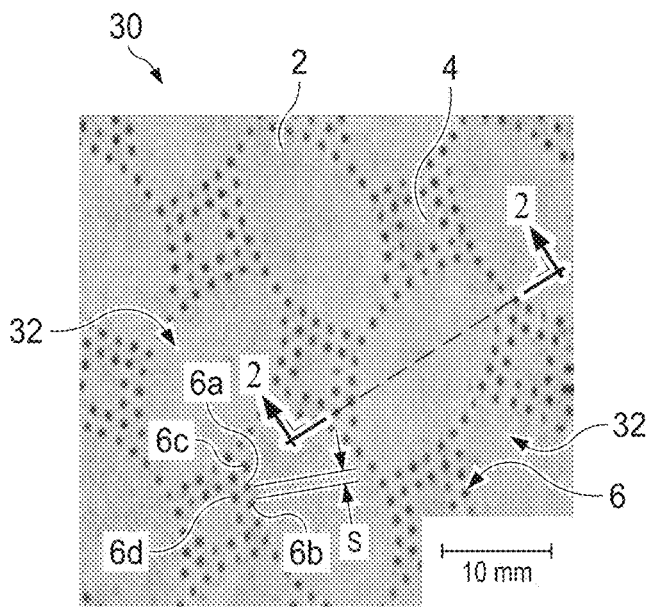
FIG. 1 is a plan view of a nonwoven.
Figure 2:
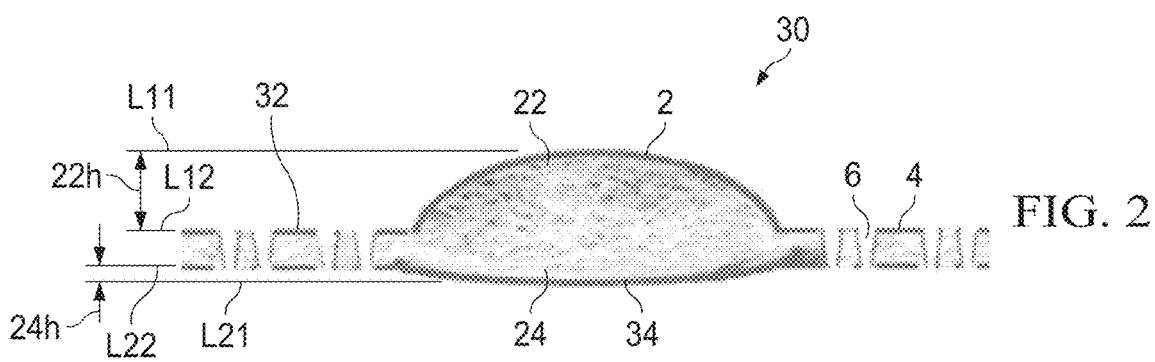
FIG. 2 is a schematic cross-section view of the nonwoven of FIG. 1.
Figure 3:
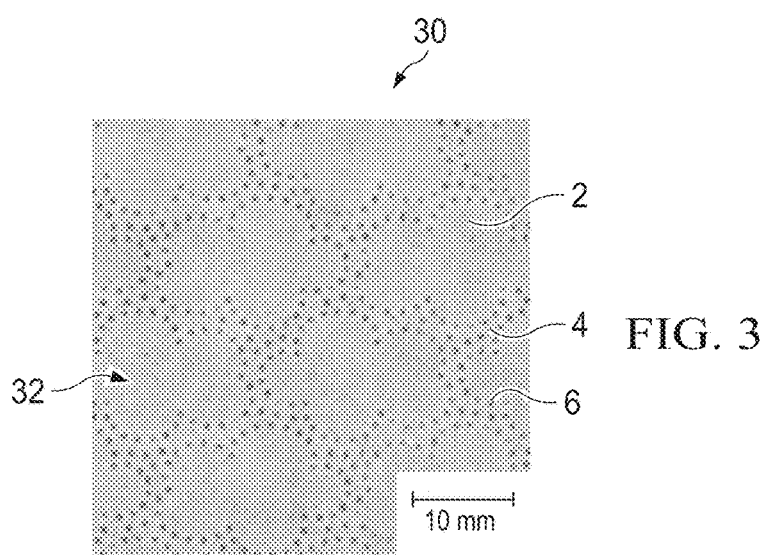
FIG. 3 is a plan view photo of a nonwoven.

The present invention provides a three-dimensional nonwoven suitable for a component of an absorbent article. FIG. 1 shows a plan view of a nonwoven of the present invention. FIG. 2 schematically shows a cross-section view of the nonwoven of FIG. 1. FIG. 3 is a plan view photo of another exemplary nonwoven of the present invention. Referring to FIGS. 1 and 2, nonwoven 30 has a first side 32, a second side 34, and comprises at least one protruded first area 2 and a second area 4 comprising a plurality of deformations, apertures in these cases. In one embodiment, the three-dimensional nonwoven 30 comprises a plurality of protruded first areas 2. When the three-dimensional nonwoven 30 comprises a plurality of protruded first areas 2, each of the protruded first areas may be substantially surrounded by the second area. Substantially surrounded herein intents to mean that at least 80% of periphery of the first area is surrounded by the second area. In another embodiment, the three-dimensional nonwoven 30 comprises a plurality of second areas 4.

First Area

Referring to FIGS. 1 and 2, the three-dimensional nonwoven 30 comprises a first side 32, a second side 34 opposite the first side 32, a protruded first area 2 which comprises an upper portion 22 formed in the first side 32 and a lower portion 24 formed in the second side 34. The protruded first area 2 provides a three-dimensional profile to the nonwoven 30. The upper portion 22 formed in the first side 32 has a shape memory index higher than the lower portion 24. With a higher shape memory index the upper portion may create a well recognizable three-dimensional perception upon heat treatment in the first side. As the upper portion 22 has a shape memory index higher than the lower portion 24, the upper portion 24 has less dense structure and a lower capillary pressure than the lower portion 22 when the nonwoven is heat-treated, which can create a capillary gradient in the nonwoven 30. The nonwoven 30 having capillary gradient can provide better fluid drainage from the first side 32 to the second side 34 of the nonwoven 30, and improve dryness and/or stain masking in an absorbent article when the nonwoven is used as a component such as topsheet of the absorbent article.

The upper portion 22 may a shape memory index no less than about 120%, or no less than about 125%, or no less than about 130%. The lower portion has a shape memory index less than about 120%, or less than about 115%.

Figure 6A:
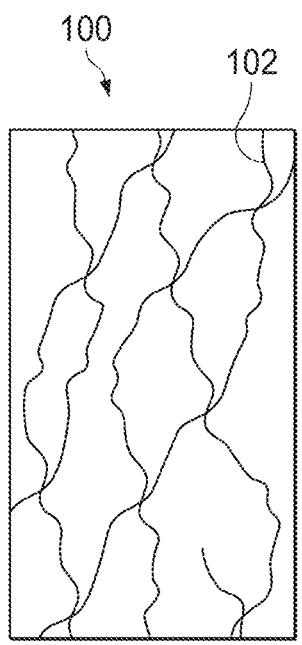
FIG. 6A-6C are schematic illustrations of a shape-memory effect.
Figure 6B:
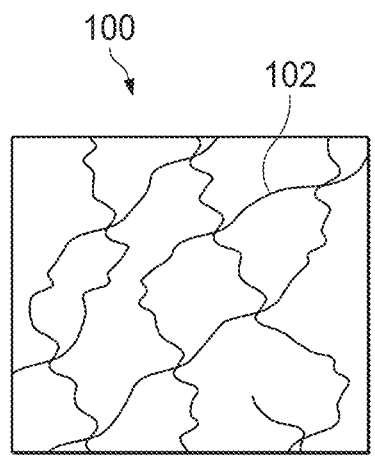
Figure 6C:
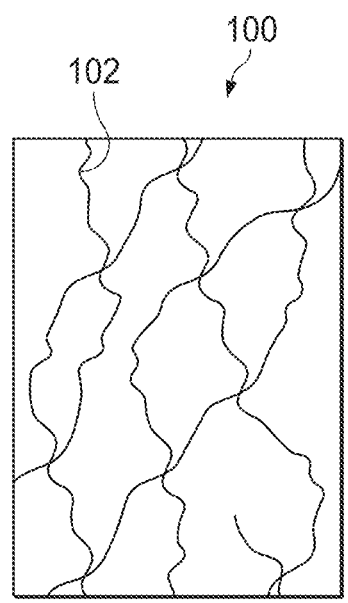

A shape memory effect is the capability of a material to recover its shape upon application of an external stimulus. A shape memory effect and shape memory fibers have been reported in publications such as Shape-Memory Polymers, Angew. Chem. Int. Ed. 2002, 41, 2034-2057, and Recent advances in shape memory polymers and composites: a review, J Mater Sci (2008) 43:254-269. The shape recovery caused by a change in temperature is called a thermally induced shape-memory effect. Referring to FIGS. 6A-6C, a material 100 comprising fibers 102 comprising shape memory polymer, when conventionally processed such as thermally and/or mechanically processed, receives its permanent shape (FIG. 6A). Afterwards, when the material 100 is deformed, for example compressed, the material 100 is compressed, and the intended temporary shape is fixed (FIG. 6B). The permanent shape is now stored in the material 100 while the material 100 shows the temporary shape. Heating up the material 100 above a transition temperature of shape memory fibers 102 constituting the material 100 induces the shape memory effect and results in the recovery of the stored, permanent shape (FIG. 6C).

The protruded first area 2 has an upper portion height 22$h$, and a lower portion height 24$h$ which is smaller than the upper portion height 22$h$. The upper portion height 22$h$ may be no smaller than about 0.80 mm to provide a well recognizable three-dimensional perception.

The lower portion height 24$h$ may be no greater than upper portion height. The lower portion height may be no greater than about 0.2 mm.

With such a small lower portion height 24$h$, the second side 34 is substantially flat which allows good connectivity between the second area 4 and an adjacent layer when the nonwoven 30 is used as a component of an absorbent article. For example, when the nonwoven 30 is used as a topsheet of an absorbent article, good connectivity between the nonwoven 30 and an adjacent absorbent layer enables an absorbent article to perform fast liquid acquisition and remain less fluid on the topsheet. Conventionally, an absorbent article having a three-dimensional topsheet relies on high density embossing to bond topsheet nonwoven to an adjacent absorbent layer to enhance connectivity between a topsheet and an adjacent absorbent layer, and it may deteriorate softness and cushiony of the topsheet, and acquisition speed.

Without wishing to be bound by theory, the nonwoven 30 has an obvious and favorable three-dimensional appearance in the first side 32 with a protruded first area(s) 2 as the upper portion 22 has a high shape memory index so that it can recover its permanent shape in a high rate. It may have a substantially flat second side 34 as the lower portion 24 recovers no or only little of its permanent shape due to a low shape memory index. With help of a second area 4 having a plurality of deformations which make the second area 4 concaved, the first area 2 having the upper portion 22 with a high shape memory index can create three-dimensional first side in the nonwoven.

The upper portion 22 may comprise a thermoplastic fiber. The upper portion may comprise a thermoplastic conjugate fiber comprising a first polymer component and a second polymer component having a lower melting point than the melting point of the first polymer component, wherein the first polymer component is present on at least part of the surface of the conjugate fiber in a lengthwise continuous configuration. The upper portion may comprise a fiber comprising a polymer selected from the group consisting of polyethylene terephthalate, polytrimethylene terephthalate, polybutylene, polyethylene terephthalate copolymer, poly (tetramethylene ether) glycol, and combinations. One type or a plurality of types can be selected, based on the application of the nonwoven.

The lower portion may comprise a thermoplastic fiber. The lower portion may comprise a thermoplastic conjugate fiber a thermoplastic conjugate fiber comprising a first polymer component and a second polymer component having a lower melting point than the melting point of the first polymer component, wherein the first polymer component is present on at least part of the surface of the conjugate fiber in a lengthwise continuous configuration. The lower portion in the nonwoven according to the present invention may comprise natural fibers such as cotton, silk, wool, hemp, pulp, and the like; reclaimed fiber such as rayon, cupra, and the like to result in a low shape memory index. One type or a plurality of types can be selected, based on the application of the nonwoven.

Thermoplastic conjugate fibers suitable for the present invention may have two-dimensional crimps and/or three-dimensional crimps. Herein, the term "two-dimensional crimp" can be understood mechanical crimping in which the peaks of the crimped fiber are sharply angled. Three-dimensional crimp may refer to crimp where the peaks are curved (wave shaped crimping) or spiral (spiral shaped crimping), crimp where both wave shaped crimping and spiral shaped crimping exist, or crimp where both mechanical crimp and at least one of wave and spiral shape crimps exist. In one embodiment, the core/sheath composite fiber has two-dimensional crimps which is cost-effective compared to a composite fiber having three-dimensional crimps.

Thermoplastic conjugate fibers suitable for the present invention may be concentric or eccentric. In one embodiment, the core/sheath composite fiber is a concentric fiber.

Thermoplastic fibers suitable for the present invention may be a thermoplastic homopolymer fiber.

The protruded first area is filled with fibers, and has substantially no hollow space underneath. As the protruded first area is filled with fibers, the three-dimensional nonwoven of the present invention may maintain three-dimensional structure stably under compression, and enhance fluid transfer to an adjacent layer when the nonwoven 30 is used as a component of an absorbent article.

The upper portion 22 and the lower portion 24 may be contiguous in a horizontal direction. The upper portion 22 and the lower portion 24 forming the protruded first area 2 are bonded by technologies known in the art. For example, the upper portion 22 and the lower portion 24 can be laminated by either adhesive or thermally bonded means, where thermal bonding includes but is not restricted to technologies such as hot air-through bonding and ultrasonic bonding. When one of the upper portion and the lower portion comprises a relatively high amount of natural fibers, bonding the first and second layer to each other using heat may be difficult as the natural fibers do not become tacky or melt upon exposure to heat. The upper portion 22 is thus attached to the lower portion 24 in bonding areas by hot-melt adhesive.

The first area may coordinate with graphics, indicia, printing, inks, color, and/or patterned adhesives, for example, located in the nonwoven or in another component of an absorbent article when it is used as a component of an absorbent article.

Second Area

Referring to FIGS. 1 and 2, the three-dimensional nonwoven 30 further comprises a second area 4. The second area 4 comprises a plurality of deformations which may comprises apertures, recesses or a combination thereof. In one embodiment, the second area 4 comprises a plurality of apertures as shown in FIGS. 1 and 2.

Deformations may be in any of circular, oval, hour-glass shaped, star shaped, polygonal and the like, and combinations thereof. Polygonal shapes include, but are not limited to triangular, quadrilateral, hexagonal, octagonal or trapezoidal. In one embodiment, deformations are circular. In another embodiment, deformations are an oval shape. deformations may have a size in a range of about 0.1 $mm^2$-about 3 $mm^2$, or in a range of about 0.2 $mm^2$-about 2 $mm^2$, or in a range of about 0.3 $mm^2$-about 1 $mm^2$. The second area may have deformations having the same size and/or shape. The second area may have deformations having different sizes and/or shapes.

The second area may comprise deformations forming a pattern. A pattern formed by deformations may be any shape of pattern, for example, a shape of one or multiple linear lines or curved lines, a circles, an ellipse, a triangle, a polygon, a flower, a cloud, and the like. The pattern may be a regular, homogeneous and uniform pattern or an irregular, non-uniform and non-homogeneous pattern. In some embodiments, nonwoven of the present invention comprises a plurality of second areas, wherein deformation patterns in the second areas are not necessarily in the same shape or size. That is, a deformation pattern in one second area may differ from a deformation pattern in another second area in the nonwoven of the present invention. Patterns may be various shapes and/or various sizes. The nonwoven of the present invention may have uniform deformation patterns.

In some embodiments, a second area comprises clustered deformations. The term "clustered deformations" herein intends to mean a deformation pattern wherein at least one deformation having at least three adjacent deformations wherein the one deformation and each of the at least three adjacent deformations has an edge-to-edge space S (shortest space between an edge of one deformation to an edge of an adjacent deformation) no greater than about 3 mm Referring to FIG. 1, the second area 4 comprises aperture 6a having at least 3 adjacent apertures 6b, 6c and 6d where each edge-to-edge space S between aperture 6a and each of apertures 6b, 6c is about 0.60 mm.

Figure 4:
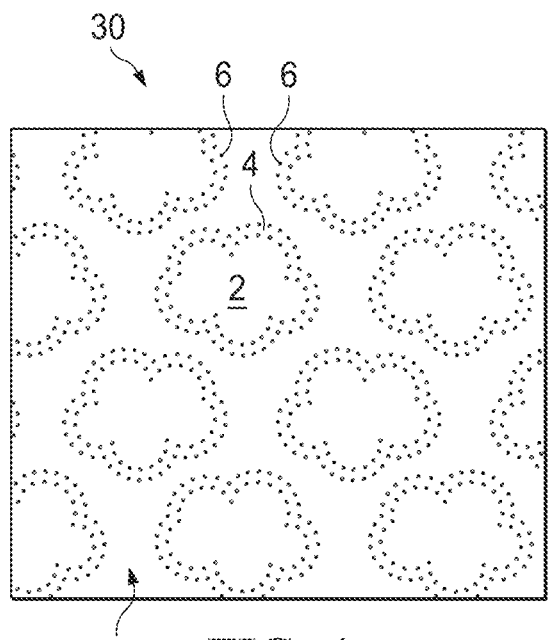
FIG. 4 is a plan view image of a nonwoven.

FIGS. 3 and 4 are another examples having at least one second area having clustered deformations.

Without wishing to be bound by theory, it is believed that clustered deformations in the second area work like anchor points in the nonwoven and restrain nonwoven from regain its bulkiness which helps form a clear three-dimensional structure as having a distinctive caliper difference between the first area and the second area. In addition, clustered deformations in the second area work like anchor points in the nonwoven and require more work input to compress the nonwoven in comparison with non-deformed nonwoven.

The deformation pattern in a second area may coordinate with graphics, indicia, printing, inks, color, and/or patterned adhesives, for example, located in the nonwoven or in another component of the absorbent article when it is used as a component of an absorbent article.

Nonwoven Configuration

A basis weight of the three dimensional nonwoven of the present invention may be appropriately selected depending on the nonwoven application. For the nonwoven of the present invention as a topsheet of an absorbent article, the integral basis weight of the upper portion and the lower portion of the nonwoven may be from about 25 g/m$^2$ to about 100 g/m$^2$, or from about 35 g/m$^2$ to about 70 g/m$^2$. For the use of the nonwoven as a topsheet of an absorbent article, in one embodiment, the integral basis weight of the nonwoven is in the range of from about 30 g/m$^2$ to about 70 g/m$^2$, or from about 35 g/m$^2$ to about 55 g/m$^2$.

A basis weight of the upper portion and the lower portion each may be from about 5 g/m$^2$ to about 50 g/m$^2$, or from about 10 g/m$^2$ to about 40 g/m$^2$, or from about 14 g/m$^2$ to about 35 g/m$^2$. A ratio of a basis weight of the upper portion/the lower portion maybe be from about 80/20 to about 20/80, or from about 60/40 to about 50/50. If the basis weight of the upper portion is too small and/or the ratio of the basis weight of the upper portion to the basis weight of the lower portion is too small, the nonwoven may not have clearly visible three-dimensional structure in the first side.

In one embodiment, the nonwoven comprises a first layer form the upper portion and a second layer forming the lower portion. In another embodiment, the nonwoven may include an intermediate layer between the first layer and the second layer. The third layer may form the upper portion, or the lower portion. The third player may partially form the upper portion and partially form the lower portion.

The nonwoven may be hydrophilic. In one embodiment, the upper portion is less hydrophilic than the lower portion in the nonwoven of the present invention. In another embodiment, the upper portion is more hydrophilic than the lower portion in the nonwoven sheet of the present invention. In another embodiment, the nonwoven is hydrophobic.

The three-dimensional nonwoven of the present invention may be a relofted nonwoven.

The lower portion may comprise fibers which has a fiber fineness no greater than a fiber fineness of fiber in the upper portion. It may contribute to introduce a capillary cascade in the nonwoven and be more effective in fluid transportation from the upper portion to the lower portion which can improve dryness and cleanness of an absorbent article when the nonwoven is used as a component of the absorbent article.

Nonwoven Manufacturing Process

The three-dimensional nonwoven of the present disclosure may be made by any suitable methods known in the art.

The nonwoven may be manufactured via a process comprising the steps of: (a) forming a first fibrous web, and forming a second fibrous web; (b) forming a composite fibrous web by overlaying the first fibrous web on the second fibrous web wherein the first fibrous web forms a first side of the composite fibrous web and the second fibrous web forms a second side of the composite fibrous web; (c) subjecting the composite fibrous web to bonding treatment to bond at least part of fibers constituting the first fibrous web and the second fibrous web to obtain a precursor nonwoven; and (d) subjecting the precursor nonwoven to a deformation forming unit to form deformations in a predetermined area to obtain a deformed nonwoven, the deformed nonwoven comprising at least one protruded first area, and a second area comprising a plurality of deformations, wherein the protruded first area comprises an upper portion in the first side and a lower portion in a second side, and wherein a shape memory index of the upper portion is higher than a shape memory index of the lower portion.

The first fibrous web and the second fibrous web may be carded webs such as parallel webs, semi-random webs, random webs, cross-webs, criss-cross webs, and the like, air-laid webs, wet-laid webs, and spunbond webs, and the like.

In some embodiments, a composite fibrous web is formed using parallel carding machines by laying a first fibrous web on a conveyor belt and overlaying a second fibrous web on the first fibrous web. In other embodiments, a composite fibrous web is formed using parallel carding machines by laying a second fibrous web on a conveyor belt and overlaying a first fibrous web on the second fibrous web. The first fibrous web may form a first side of the three-dimensional nonwoven, and the second fibrous web may form a second side of the three-dimensional nonwoven. The first fibrous web laid down facing the conveyor belt may ensure that the three-dimensional nonwoven to have a smooth first side with little fuzz concern when the three-dimensional nonwoven is used as a topsheet in an absorbent article in such a way that the first side of the three-dimensional nonwoven forms at least part of a skin-facing surface of the absorbent article.

The bonding treatment of a composite fibrous web can be conducted using any conventionally known fiber bonding method. Examples of such a bonding method include hot air through-type thermal bonding and ultrasonic bonding.

Figure 7:
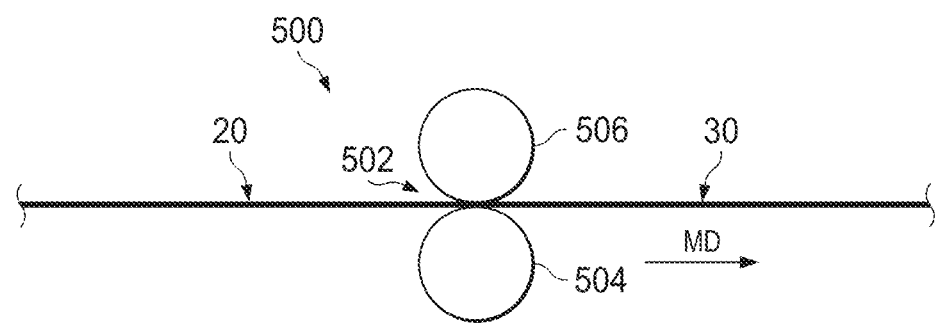
FIG. 7 is a schematic illustration of one example process for forming the three-dimensional nonwovens of the present disclosure.
Figure 8:
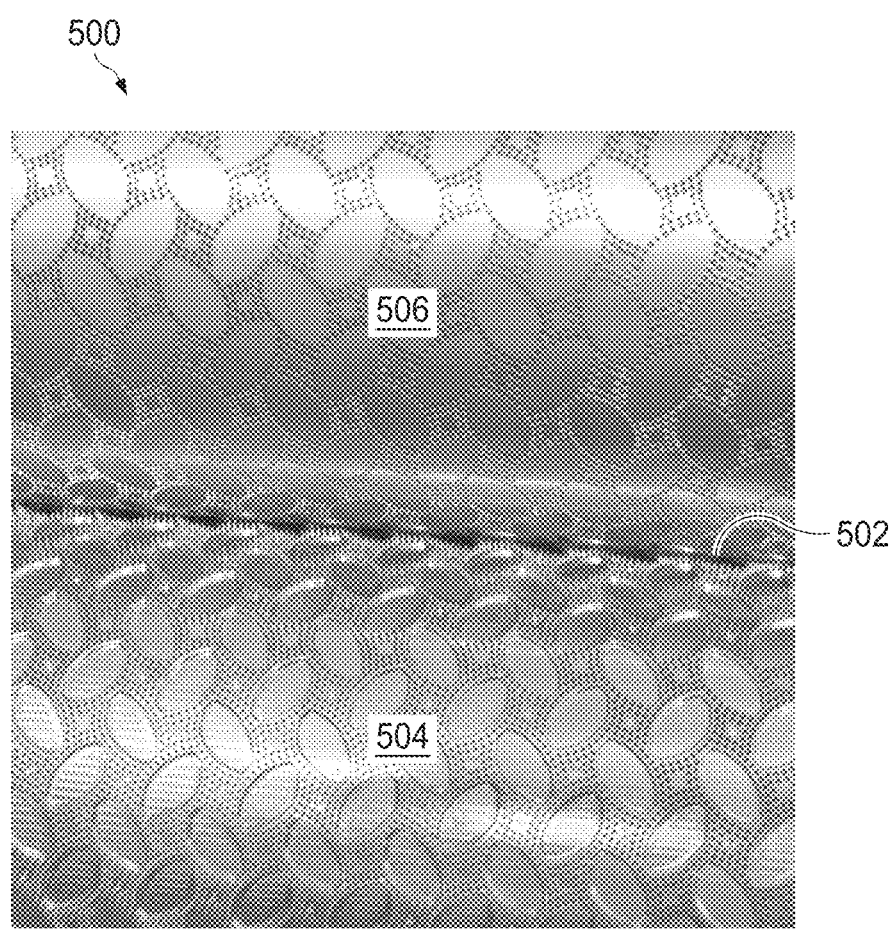
FIG. 8 is a view of intermeshing engagement of portions of a pair of rolls in accordance with the present disclosure.
Figure 9:
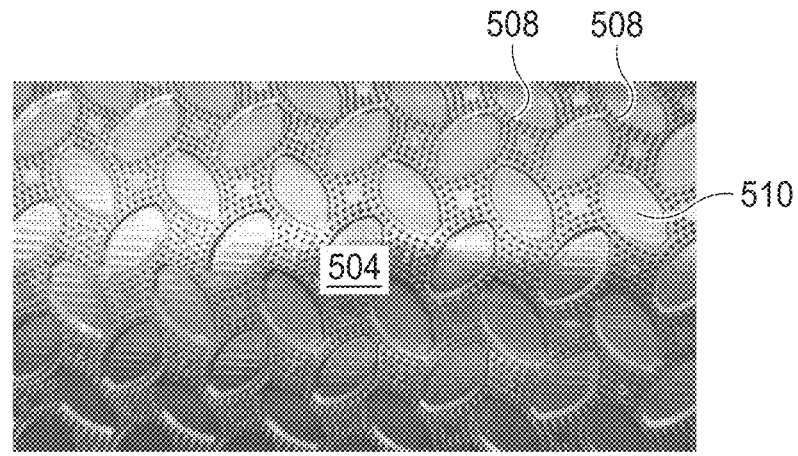
FIG. 9 is a view of a portion of the first roll in the pair of rollers in FIG. 8.
Figure 10:
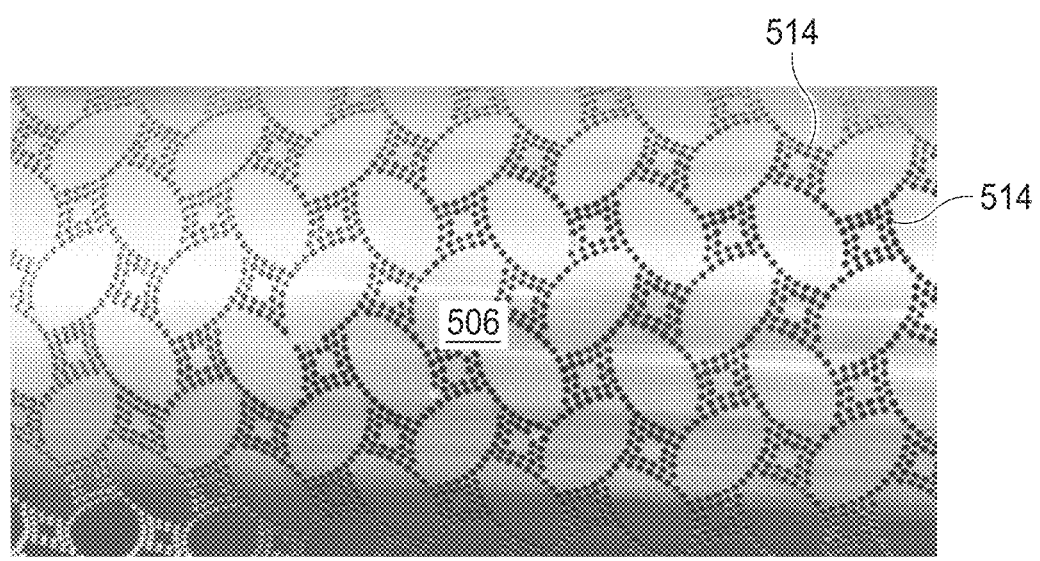
FIG. 10 is a view of a portion of the second roll in the pair of rollers in FIG. 8

Deformation of precursor nonwoven to form a three-dimensional nonwoven can be conducted using any conventionally known nonwoven deformation method. An exemplary deformation equipment is a pair of rolls comprising a first roll and a second roll. Referring to FIG. 7, precursor nonwoven 20 may be deformed by passing it through a nip 502 formed by a pair of rolls 500 having two intermeshing rolls 504 and 506, to form a three-dimensional nonwoven 30. At least one of the rolls 504 and 506 may be heated. FIG. 8 shows a view of intermeshing engagement of portions of an exemplary first and a second rolls in the pair of rolls. FIG. 9 is a view of a portion of the first roll 504. FIG. 10 is a view of a portion of the second roll 506. In one embodiment, referring to and FIGS. 1-2 and FIGS. 8-10, a first roll 504 may create the protruded first area 2 and the second area 4 having a plurality of apertures 6 in the nonwoven 30 (in combination with the second roll). The first roll 504 may comprise a plurality of conically-shaped protrusions 508 extending radially outwardly from the first roll 504. The first roll 504 may also comprise a plurality of recesses 510 formed in a radial outer surface of the first roll 504. The second roll 506 may comprise a plurality of recesses 514 formed in the radial outer surface of the second roll 506. The recesses 510 formed in the first roll 504 have a different size, shape, height, area, width, and/or dimension than the recesses 514 formed in the second roll 506. The recesses 510 in the first roll 504 may be configured to at least partially the outer surface of the second roll 506, thereby creating the first area 2 in the nonwoven 30. The recesses 510 may be deep enough so that the portion of the nonwoven forming the first area 2 will be less compressed than the portion of the nonwoven forming the second area 4. These recesses 510 may have a depth no less than about 1 mm. These recesses 510 may have an area no less than about 100 mm². If the area of 510 is too small, it may increase direct heating of the first side of the nonwoven which causes overheat of the nonwoven, so that the first side of the nonwoven becomes flat and may not create desirably recognizable three-dimensional perception in the first side of the nonwoven. Specifically, as the recess 510 in the first roll 504 engages with the outer surface of the second roll 506, there is a sufficient space between the first side of the nonwoven and the surface of the recess 510 in a rotational axial direction so that the upper portion height 22h of the nonwoven 30 is higher than the lower portion height 24h of the nonwoven 30. This feature may enable the first area 2 to have a greater upper portion height 22h as well as a soft and cushiony feel compared to a case when portions in the first roll 504 corresponding to the recesses 510 are flat. Having the recess 510, the first roll 504 and the second roll 506 can create a height difference between the first area 2 and the second area 4 when the precursor nonwoven 20 passes through the nip 502 which determines a permanent shape of the nonwoven 30. As the first area 2 have a permanent shape with a greater height than the case when portions in the first roll 504 corresponding to the recesses 510 are flat, and the upper portion 22 of nonwoven 30 has a high shape memory effect, the upper portion 22 can recover a three-dimensional shape in a high rate under heat condition even it is compressed in package, storage, or in converting.

In some embodiment, the first roll 504 has flat areas corresponding to the recesses 510.

The recesses 514 in the second roll 506 may be configured to at least partially receive the protrusions 508 in the first roll 504 thereby creating the apertures 6 in the precursor nonwoven 20 when the precursor nonwoven 20 passes through a nip 502 formed by the first roll 504 and the second roll 506.

Figure 11:
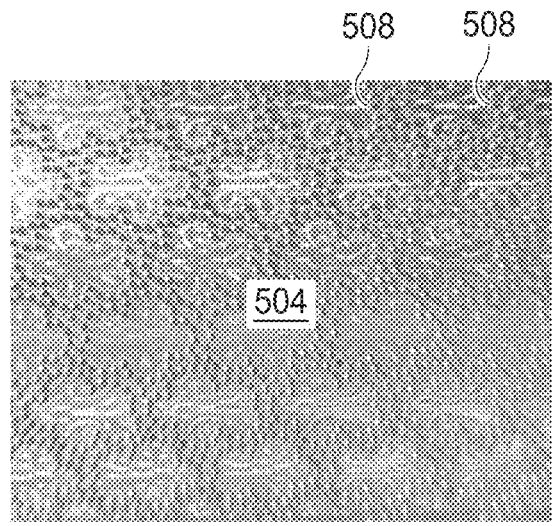
FIG. 11 is a view of a portion of another first roll.
Figure 12:
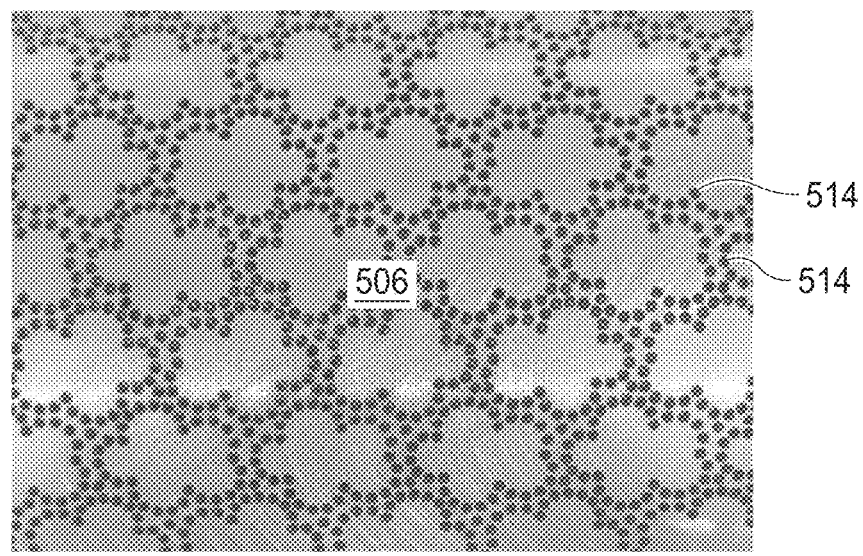
FIG. 12 is a view of a portion of a second roll to be intermeshed with the first roll in FIG. 11.

FIG. 11 and FIG. 12 are views of portions of another exemplary first roll and second roll to produce a three-dimensional nonwoven having protruded first areas 2 and a second area 4 having a plurality of apertures 6 (in combination with the second roll), referring to FIG. 11. The first roll 50 may comprises a plurality of conically-shaped protrusions 508 extending radially outwardly from the first roll 504. The second roll 506 may comprise a plurality of recesses 514 formed in the radial outer surface of the second roll 506. The recesses 514 in the second roll 506 may be configured to at least partially receive the protrusions 508 in the first roll 504 thereby creating the apertures 6 and form the second area 4 in the nonwoven 30. Flat areas surrounded by the protrusions 508 in the first roll 504, and flat areas surrounded by the plurality of recesses 514 in the second roll 506 form the first areas 2 in a three-dimensional nonwoven 30.

Referring to FIGS. 8-10, and FIGS. 11 and 12, intermeshing engagement of the first roll 504 and the second roll 506, when a precursor nonwoven 20 passes through a nip 502 formed by the first roll 504 and the second roll 506, create at least one first area 2, and at least one second area 4 comprising a plurality of apertures 6.

To make the second side 34 substantially flat, the second roll 506 is preferred to be heated to a temperature close to and higher than a melting temperature of a polymer component of fibers, a lowest melting temperature when the fibers are composed of multiple polymers, in the lower portion 24 of the nonwoven 30, and adjust the speed of rolls to allow enough time for fibers in the lower portion of the precursor nonwoven to be heat-fused and the surface of the nonwoven is flattened.

The three-dimensional nonwoven may further proceed with a relofting process to increase bulkiness of the nonwoven and enhance three-dimensional appearance of the nonwoven. Relofting process is a process to make a nonwoven regain its bulkiness by providing energy to the nonwoven. Relofting process may be conducted via various processes known to those skilled in the art. A heating source includes oven, burner, or infrared radiation, producing heat to increase the temperature of the nonwoven. As the temperature increases, fibers within the nonwoven begin to soften, and at least some of the fibers begin to realign with, and/or detach from, the fibers. The realigning and/or detaching fibers cause the nonwoven to increase in caliper, thereby decreasing the density of the nonwoven. The final relofted caliper is dependent upon the temperature and the residence time, which is the overall time that the nonwoven is exposed to the increased temperature in the relofting process.

In one embodiment, relofting a nonwoven can be conducted in accordance with methods disclosed in PCT/US2019/066455 filed on Sep. 5, 2019. The PCT application is hereby incorporated herein by reference in its entirety unless expressly excluded or otherwise limited.

In another embodiment, relofting a nonwoven can be conducted by heating the nonwoven in an oven applying hot air.

Absorbent Article

An absorbent article according to the present invention comprises a skin-facing surface, a garment-facing surface, a liquid permeable topsheet, a liquid impermeable backsheet, an absorbent structure disposed between the topsheet and the backsheet, and a three-dimensional nonwoven of the present invention. Absorbent articles comprising the three-dimensional nonwoven of the present disclosure may be made by any suitable methods known in the art. In particular, the articles may be hand-made or industrially produced at high speed.

The absorbent articles of the present invention may be produced industrially by any suitable means. The different layers may thus be assembled using standard means such as embossing, thermal bonding, gluing or any combination thereof.

Topsheet

Topsheet can catch body fluids and/or allow the fluid penetration inside the absorbent article. When a topsheet comprises the three-dimensional nonwoven of the present invention, the upper portion of the first area of the nonwoven is preferably, disposed on a side in contact with the skin.

Backsheet

Any conventional liquid impervious backsheet materials commonly used for absorbent articles may be used as backsheet. In some embodiments, the backsheet may be impervious to malodorous gases generated by absorbed bodily discharges, so that the malodors do not escape. The backsheet may or may not be breathable.

Absorbent Core

It may be desirable that the absorbent article further comprises an absorbent core disposed between the topsheet and the backsheet. As used herein, the term "absorbent core" refers to a material or combination of materials suitable for absorbing, distributing, and storing fluids such as urine, blood, menses, and other body exudates. Any conventional materials for absorbent core suitable for absorbent articles may be used as absorbent core.

The nonwoven of the present invention delivers a pleasing three-dimension perception, and suitable for a component of an absorbent article.

The absorbent article of the present invention may comprise a topsheet comprising the three-dimensional nonwoven of the present invention such that the first side of the three-dimensional nonwoven forms at least part of a skin-facing surface of the absorbent article.

The absorbent article of the present invention may further comprise an outermost layer comprising the three-dimensional nonwoven of the present invention such that the first side of the three-dimensional nonwoven forms at least part of a garment-facing surface of the absorbent article.

Test Methods

1. Height Test (1) Sample Preparation

If a nonwoven is available in its raw material form, a specimen with the size about 25 mm×25 mm or a bigger size is cut from the raw material to include at least one complete a protruded first area and part of two adjacent second areas. If a nonwoven is a component layer such as a topsheet of an absorbent article, the absorbent article this size is cut and the nonwoven layer is removed from the absorbent article, using a razor blade to excise the nonwoven layer from the underling layers of the absorbent article. A cryogenic spray (such as Cyto-Freeze, Control Company, Houston TX) or other suitable solvents that do not permanently alter the properties of the nonwoven layer composition may be used to remove the nonwoven layer specimen from the underling layers if necessary. Any remaining adhesive may be removed from the specimen by the following steps using Tetrahydrofuran (THF) as solvent.

1) In a hood, transfer 1 liter of THF into the 3-4 liter beaker.
2) Submerge specimen in the 1 liter of THF.
3) Place beaker on shaking table and stir gently for 15 minutes and keep solution with sample sit for 5 additional minutes.
4) Take specimen out of THF solution, and carefully squeeze THF solution out of specimen.
5) Let specimen air dry in hood for a minimum of 15 minutes.

To obtain a nonwoven cross section specimen, the nonwoven is laid on a flat bench with a first side upward, and is cut along line 2-2 so as to cut the protruded first area 2 in its apex height and sandwiched the cut protruded first area 2 between second areas 4, referring to FIGS. 1 and 2.

(2) Image Generation

Microscopic images of nonwoven specimens are taken by an optical microscope, 3CCD optical microscopy-Keyence VHX5000 or equivalent, and are used to measure an upper portion height and a lower portion height of nonwoven.

The nonwoven specimen is placed on the microscope stage using double-sided conductive tape or clapped to fix the specimen. An appropriate magnification can be chosen such that features in the nonwoven specimen are suitably clear and enlarged for measurement.

(3) Height Measurement

Referring to FIG. 2, draw a line L12 connecting the first side surface of one second area 4 and an adjacent second area 4 sandwiching a first area 4, then draw another line L11 contacting the apex of an upper portion 22 in the first area 2 in parallel to line L12. A distance between line L11 and line L12 is measured and reported as an upper portion height 22h. Then, draw a line L22 connecting the second side surface of the second area 4 and the adjacent second area 4 sandwiching the first area 4, then draw another line L21 contacting the apex of a lower portion of the first area 2 in parallel to line L22. A distance between line L21 and line 22 is measured and reported as a lower portion height 24h.

A height to the nearest 0.01 mm is reported. For each nonwoven sample, 3 images of different nonwoven cross section parts are tested. The reported value is the average of the 3 recorded measurements for each nonwoven.

2. Shape Memory Index Test (1) Fresh Height

Fresh heights, heights of the upper portion and the lower portion in a nonwoven at a fresh condition, are measured according to Height Test after the nonwoven is conditioned for 3 hrs under pressure of 12 KPa.

(2) Recovered Height

Recovered heights, heights of the upper portion and the lower portion in a nonwoven at recovered condition, are measured according to Height Test after heat-treating the fresh conditioned nonwoven samples at 90° C. for 10 secs in an oven chamber.

(3) Shape Memory Index

Shape memory index is calculated according to the equitation (I) below when the upper portion or the lower portion has a fresh height and a recovered height higher than 0.2 mm. the upper portion or the lower portion is considered has no shape memory effect, and has shape memory index is 100.

$$\text{Shape memory index} = (\text{recovered height}/\text{fresh height}) \times 100 \tag{I}$$

When the upper portion or the lower portion has a fresh height and a recovered height no higher than 0.2 mm, the upper portion or the lower portion is considered having no shape memory effect and having shape memory index of 100%.

3. Three-Dimensional Appearance Test

Three-dimensional appearance in the first side of a nonwoven is evaluated to three categories as below.

Not good: Three-dimensional appearance is either not obvious or not favorable

Good: Three-dimensional appearance looks comfortable and favorable

EXAMPLES

Example 1: Nonwoven Preparation

Nonwovens 1-9 were produced using various first fibrous webs and second fibrous webs indicated in Table 1. For each of Nonwovens 1-5 and 7-9, a composite nonwoven web was fabricated using parallel carding machines by laying a first fibrous web on a conveyor belt and overlaying a second fibrous web on the first fibrous web. For Nonwoven 7, a composite nonwoven web was fabricated by laying a first fibrous web on a conveyor belt and overlaying a spunbond web as a second fibrous web on the first fibrous web. Each composite nonwoven web was heat-treated at the temperatures 130-140° C. using a hot air through-type thermal treatment apparatus using a conventional process to produce a precursor nonwoven. The precursor nonwoven was put into a mechanical aperturing process comprising a pair of rolls to produce three-dimensional or second-dimensional nonwovens.

Example 2. Nonwoven Properties

The obtained nonwoven were evaluated as described below. Shape memory index was obtained according to Shape Memory Index Test and Height Test disclosed herein. Microscopic images were taken at magnification of 20×.

Figure 13:
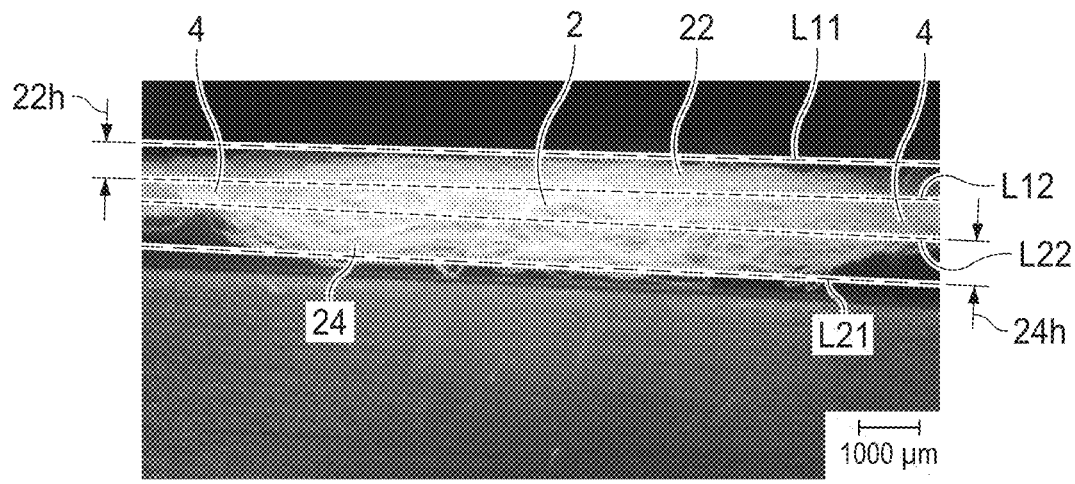
FIG. 13 is a microscopic image of a cross section view of Nonwoven 4.
Figure 14:
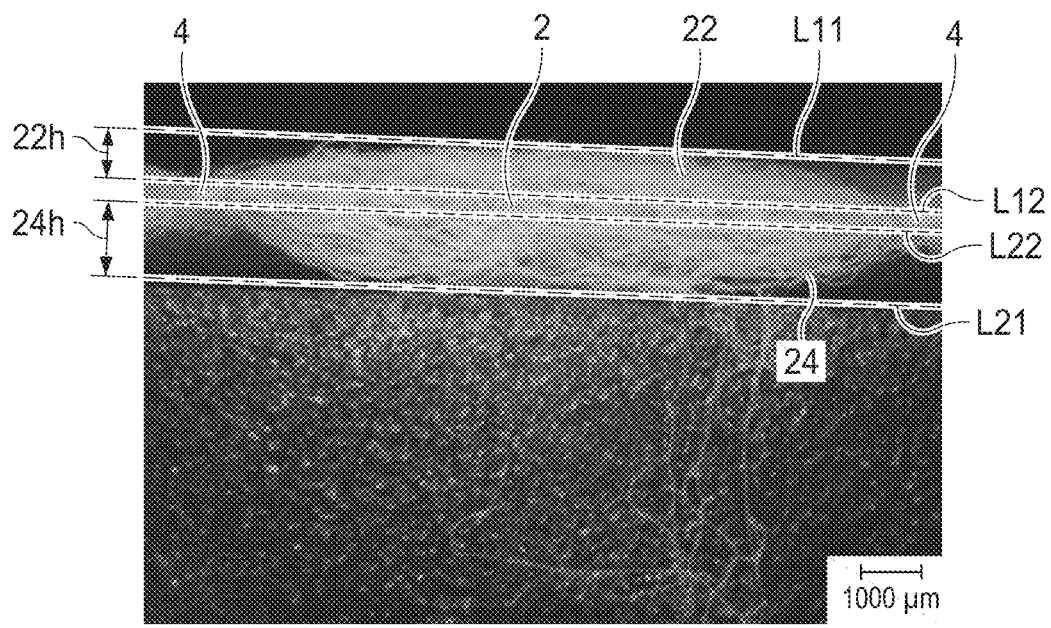
FIG. 14 is another microscopic image of a cross section view of Nonwoven 4.

FIG. 13 is a microscopic image of a cross section view of Nonwoven 4 showing an upper portion height $22h$ and a lower portion height $24h$ at fresh condition where the upper portion height $22h$ is 0.592 mm and the lower portion height $24h$ is 0.735 mm FIG. 14 is a microscopic image of a cross section view of Nonwoven 4 showing an upper portion height $22h$ and a lower portion height $24h$ at a recovered condition where the upper portion height $22h$ is 0.824 mm and the lower portion height $24h$ is 1.215 mm.

Figure 15:
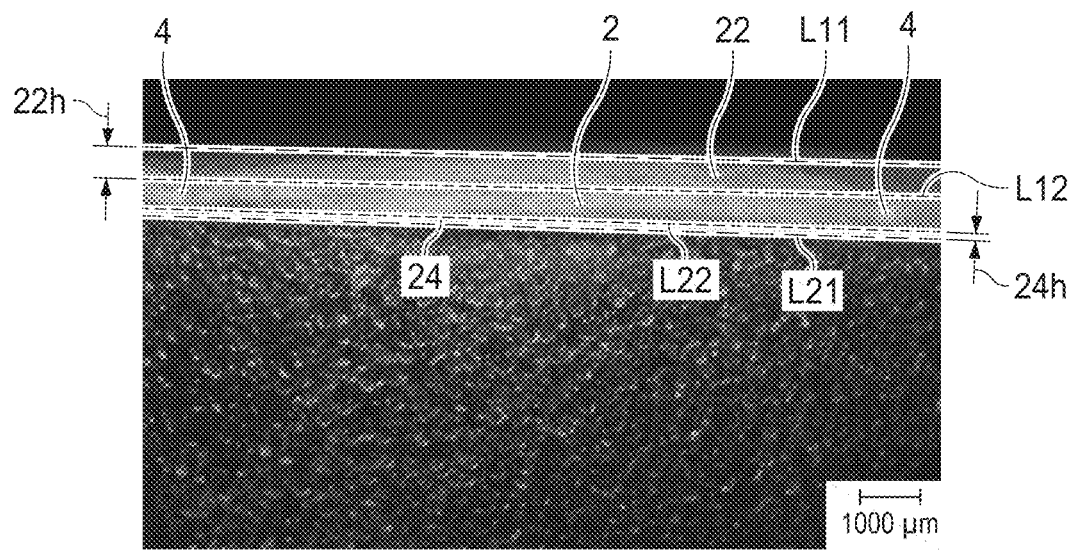
FIG. 15 is a microscopic image of a cross section of Nonwoven 7.
Figure 16:
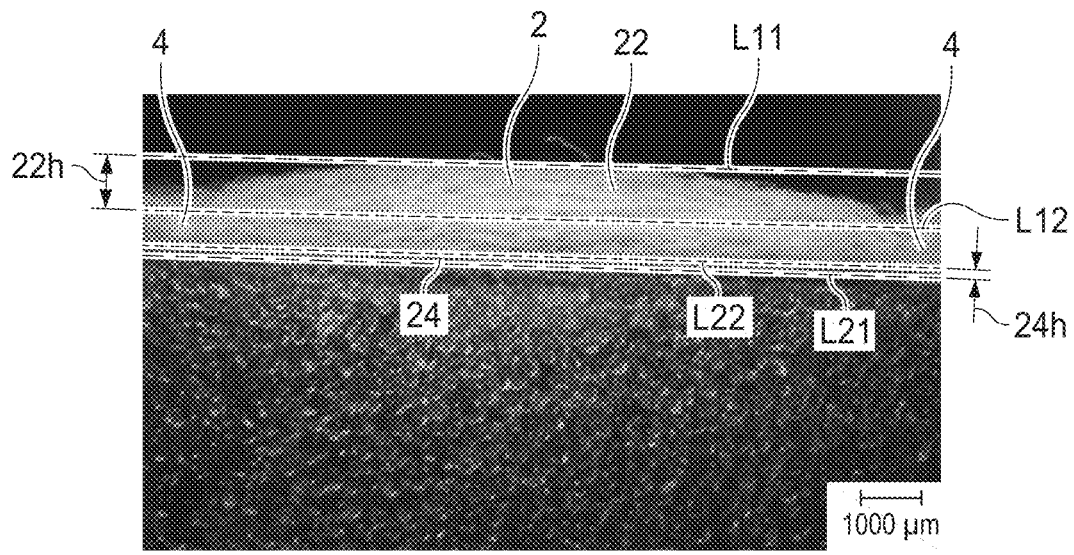
FIG. 16 is another microscopic image of a cross section view of Nonwoven 7.

FIG. 15 is a microscopic image of a cross section view of Nonwoven 7 showing an upper portion height $22h$ and a lower portion height $24h$ at fresh condition where the upper portion height $22h$ is 0.520 mm and the lower portion height $24h$ is 0.114 mm FIG. 16 is a microscopic image of a cross section view of Nonwoven 7 showing an upper portion height $22h$ and a lower portion height $24h$ at a recovered condition where the upper portion height $22h$ is 0.886 mm and the lower portion height $24h$ is 0.162 mm.

Three-dimensional appearance of nonwovens was evaluated according to Three-dimensional Appearance Test disclosed herein with 4 panels. All results are indicated in Table 1 below.

TABLE 1

| | | Nonwoven 1 | Nonwoven 2 | Nonwoven 3 | Nonwoven 4 | Nonwoven 5 |
|---|---|---|---|---|---|---|
| First fibrous web (25 gsm) | Fiber | PE/PP carded | PE/PP carded | 85% PE/PET 15% PET carded | PE/PET carded | PE/PET carded |
| | Fiber fineness (denier) | 2.0 | 2.0 | 2.0 | 1.5 | 2.0 |
| Second fibrous web (15 gsm) | Fiber | PE/PP carded | PE/PET carded | PE/PP carded | PE/PET carded | PE/PET carded |
| | Fiber fineness (denier) | 2.0 | 2.0 | 2.0 | 4.0 | 2.0 |
| Nonwoven Properties | Deformation pattern | FIG. 1 | FIG. 1 | FIG. 1 | FIG. 1 | FIG. 1 |
| | Upper portion fresh height (mm) | 0.64 | 0.66 | 0.73 | 0.56 | 0.70 |
| | Upper portion recovered height (mm) | 0.66 | 0.70 | 1.10 | 0.78 | 0.83 |
| | Upper portion Shape memory index (%) | 103 | 106 | 151 | 140 | 117 |
| | Lower portion fresh height (mm) | 0.73 | 0.77 | 0.73 | 0.73 | 0.53 |
| | lower portion recovered height (mm) | 0.75 | 1.58 | 0.85 | 1.32 | 0.81 |
| | Lower portion Shape memory index (%) | 103 | 205 | 116 | 181 | 153 |
| | 3-D appearance | Not good | Not good | Good | Not good | Not good |

| | | Nonwoven 6 | Nonwoven 7 | Nonwoven 8 | Nonwoven 9 |
|---|---|---|---|---|---|
| First fibrous web (25 gsm) | Fiber | PE/PET carded | PE/PET carded | PE/PET carded | PE/PET carded |
| | Fiber fineness (denier) | 2.0 | 2.0 | 2.0 | 2.0 |
| Second fibrous web (15 gsm) | Fiber | PE/PP Spunbond* | PE/PP carded | PE/PP carded | PE/PP carded |
| | Fiber fineness (denier) | 2.0 | 2.0 | 2.0 | 2.0 |

TABLE 1-continued

Figure 5:
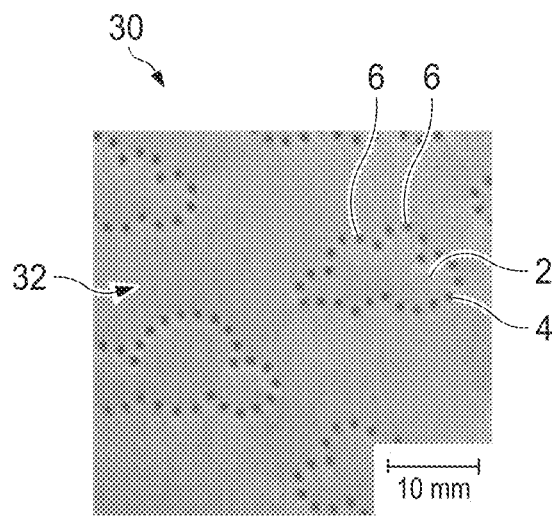
FIG. 5 is a plan view photo of a nonwoven.

| Nonwoven Properties | Deformation pattern | FIG. 1 | FIG. 1 | FIG. 3 | FIG. 5 |
|---|---|---|---|---|---|
| | Upper portion fresh height (mm) | 0.56 | 0.55 | 0.63 | Below 0.2 |
| | Upper portion recovered height (mm) | 1.01 | 0.87 | 0.92 | Below 0.2 |
| | Upper portion Shape memory index (%) | 180 | 160 | 146 | 100 |
| | Lower portion fresh height (mm) | Below 0.2 | Below 0.2 | Below 0.2 | Below 0.2 |
| | lower portion recovered height (mm) | Below 0.2 | Below 0.2 | Below 0.2 | Below 0.2 |
| | Lower portion Shape memory index (%) | 100 | 100 | 100 | 100 |
| | 3-D appearance | Good | Good | Good | Not good |

All PET/PE fibers: ETC323, JNC corporation, China
All PP/PE fibers: TA21, Jiangnan Fiber, China
All PET fibers: YZW122, Yizheng chemical fiber, China
PE/PP Spunbond*: Pegas nonwoven, Czech Republic Nonwovens 3 and 6-8
Nonwoven 9

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An absorbent article comprising a skin-facing surface, a garment-facing surface, a liquid permeable topsheet, a liquid impermeable backsheet, an absorbent structure disposed between the topsheet and the backsheet, and a three-dimensional nonwoven,
    wherein the three-dimensional nonwoven comprises:
        a plurality of shape memory polymer fibers,
        a first side,
        a second side,
        a protruded first area comprising an upper portion in the first side and a lower portion in the second side, and
        a second area comprising a plurality of deformations,
    wherein at least one deformation has at least three adjacent deformations,
    wherein an edge to edge space is no greater than about 3 mm between the at least one deformation and each of the at least three adjacent deformations,
    wherein the upper portion comprises an upper portion height,
    wherein the lower portion comprises a lower portion height,
    wherein the lower portion height is less than the upper portion height as measured according to Height Test,
    wherein a shape memory index of the upper portion is higher than a shape memory index of the lower portion, and
    wherein the first area is filled with fibers.

2. The absorbent article of claim 1, wherein the three-dimensional nonwoven comprises a plurality of the first areas, each of the first areas being substantially surrounded by the second area.

3. The absorbent article of claim 1, wherein the upper portion has a shape memory index no less than about 120% as measured according to Shape Memory Index Test.

4. The absorbent article of claim 1, wherein the lower portion has a shape memory index less than about 120% as measured according to Shape Memory Index Test.

5. The absorbent article of claim 1, wherein the upper portion height is no smaller than about 0.80 mm as measured according to Height Test.

6. The absorbent article of claim 1, wherein the lower portion height is no greater than about 0.2 mm.

7. The absorbent article of claim 1, wherein the deformations are apertures, recesses or a combination thereof, and formed from the first side toward the second side.

8. The absorbent article of claim 1, wherein the upper portion comprises a fiber comprising a polymer selected from the group consisting of polyethylene terephthalate, polytrimethylene terephthalate, polybutylene, polyethylene terephthalate copolymer, poly(tetramethylene ether) glycol, and combinations thereof.

9. The absorbent article of claim 1, wherein the topsheet comprises the three-dimensional nonwoven such that the first side of the three-dimensional nonwoven forms at least part of the skin-facing surface.

10. The absorbent article according to any one of claims 1-5, or 6-7, wherein the absorbent article comprises an outermost layer comprising the three-dimensional nonwoven such that the first side of the three-dimensional nonwoven forms at least part of the garment-facing surface.

11. A three-dimensional nonwoven comprising:
a plurality of shape memory polymer fibers, a first side, a second side, a protruded first area comprising an upper portion in the first side and a lower portion in the second side, and a second area comprising a plurality of deformations,
wherein the upper portion has a shape memory index higher than a shape memory index of the lower portion, and
wherein the first area is filled with fibers.

12. The three-dimensional nonwoven of claim 11, wherein the three-dimensional nonwoven comprises a plurality of the first areas, each of the first areas being substantially surrounded by the second area.

13. The three-dimensional nonwoven of claim 11, wherein the upper portion has a shape memory index no less than about 120% as measured according to Shape Memory Index Test.

14. The three-dimensional nonwoven of claim 11, wherein the lower portion has a shape memory index less than about 120% as measured according to Shape Memory Index Test.

15. The three-dimensional nonwoven of claim 12, wherein the first area has an upper portion height no smaller than about 0.80 mm as measured according to Height Test.

16. The three-dimensional nonwoven of claim 11, wherein the lower portion height is no greater than about 0.2 mm.

17. The three-dimensional nonwoven of claim 11, wherein the deformations are apertures, recesses or a combination thereof, and formed from the first side toward the second side.

18. The three-dimensional nonwoven of claim 11, wherein the second area comprises at least one deformation having at least three adjacent deformations, wherein the one deformation and each of the at least three adjacent deformations has an edge to edge space no greater than about 3 mm.

19. The three-dimensional nonwoven according to any of claims 11-18, wherein the upper portion comprises a fiber comprising a polymer selected from the group consisting of polyethylene terephthalate, polytrimethylene terephthalate and a combinations thereof.

20. The absorbent article of claim 1, wherein the upper portion is less dense than the lower portion.

21. The absorbent article of claim 1, wherein the upper portion has a lower capillary pressure than the lower portion.

* * * * *